United States Patent [19]

Primich et al.

[11] 3,978,703

[45] Sept. 7, 1976

[54] AUTOMATIC STRIP CUTTER

[75] Inventors: Theodore Primich, Merrillville;
David A. Strilich; David McLeroy,
both of Hobart, all of Ind.

[73] Assignee: Gary Steel Products Corporation,
Gary, Ind.

[22] Filed: June 23, 1975

[21] Appl. No.: 589,253

[52] U.S. Cl. .................................... 72/131; 72/178;
83/208; 83/210; 83/236; 83/261; 83/269;
83/282
[51] Int. Cl.² ...................... B21F 11/00; B26D 5/26
[58] Field of Search ............ 83/208, 210, 236, 257,
83/261, 269, 282; 72/131, 178

[56] References Cited
UNITED STATES PATENTS

| | | | |
|---|---|---|---|
| 2,735,055 | 2/1956 | Thomas | 83/208 X |
| 3,191,475 | 6/1965 | Scott et al | 83/261 X |
| 3,599,521 | 8/1971 | Lee | 83/236 X |
| 3,620,114 | 11/1971 | Chudyk | 83/208 X |
| 3,760,669 | 9/1973 | Rosenthal et al | 83/208 X |

FOREIGN PATENTS OR APPLICATIONS

| | | | |
|---|---|---|---|
| 1,072,836 | 6/1967 | United Kingdom | 83/261 |

*Primary Examiner*—Willie G. Abercrombie
*Attorney, Agent, or Firm*—Burmeister, York,
Palmatier, Hamby & Jones

[57] ABSTRACT

Apparatus for automatically cutting sections of measured length from a coil of an elongated strip which has a rotatable mounting device for the coil, a feed and straightener driven at a constant speed for pulling the strip from the coil, a hump table, a speed control unit with a pair of pinch rolls, a shears, and a device for generating a first signal when the leading edge of the strip has been transported past the shears by a distance equal to the length of the measured section for breaking the pinch rolls to stop movement of the strip at the shears and for actuating the shears, said device also generating a second signal when the leading edge of the strip has been transported past the shears by a shorter distance than the measured length of the section for actuating a pneumatic cylinder to drive the pinch rolls toward each other and grip the strip, the lower pinch roll being driven by a constant speed motor at a circumferential speed less than the speed of the strip from the feeder, thus producing a hump between the feeder and pinch rolls.

11 Claims, 11 Drawing Figures

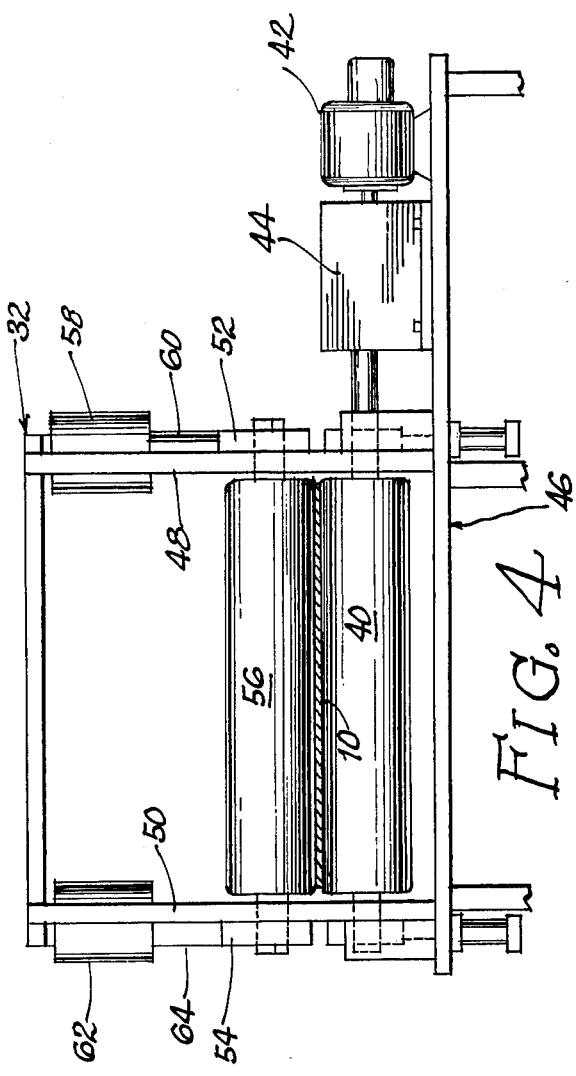
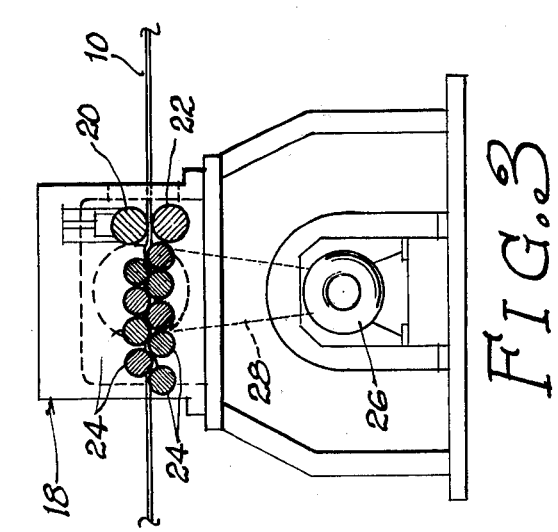
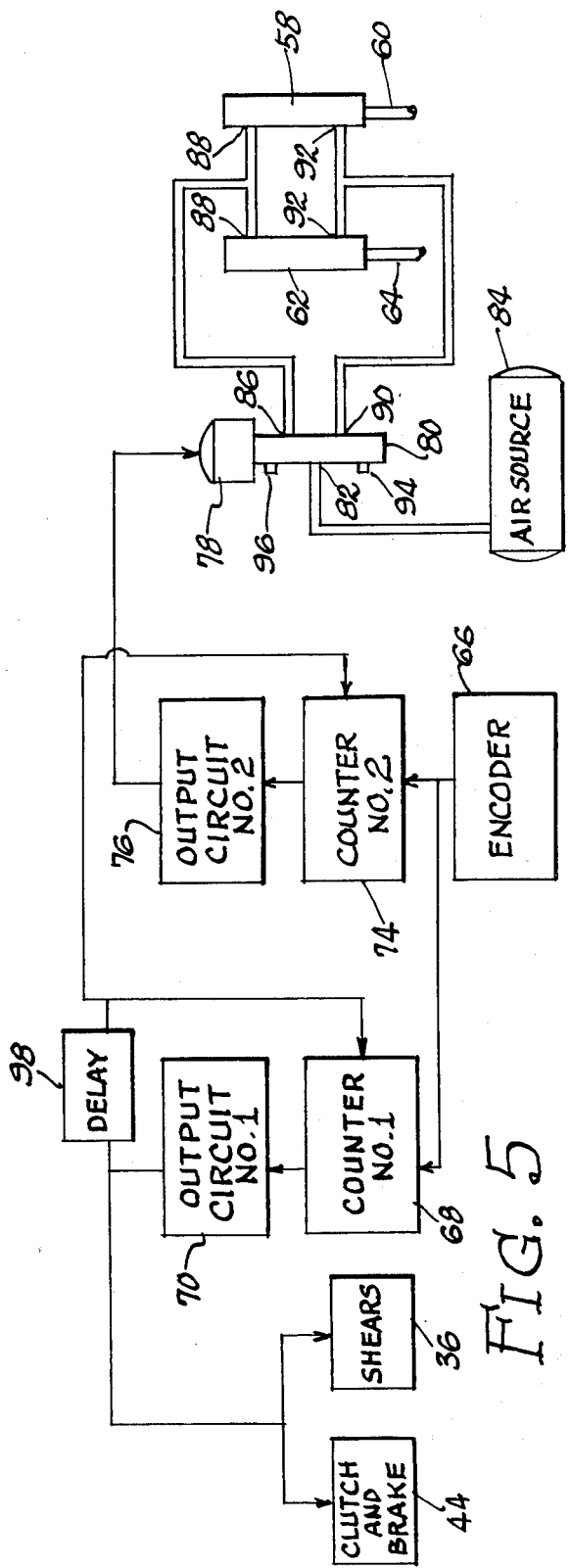

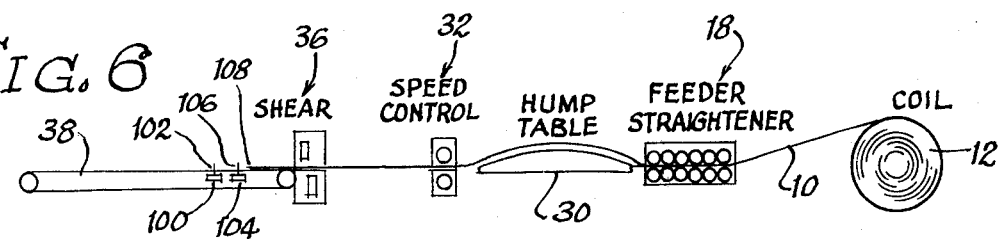
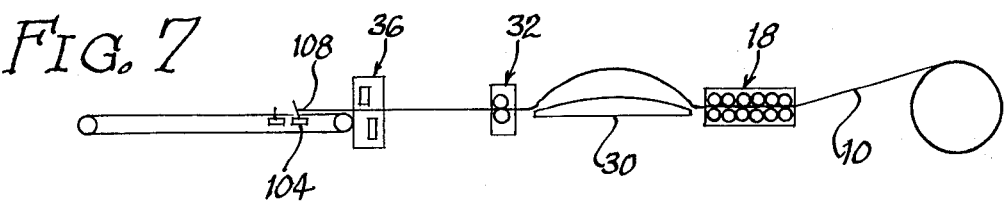
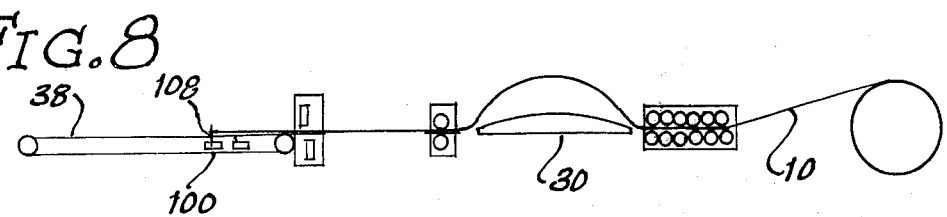
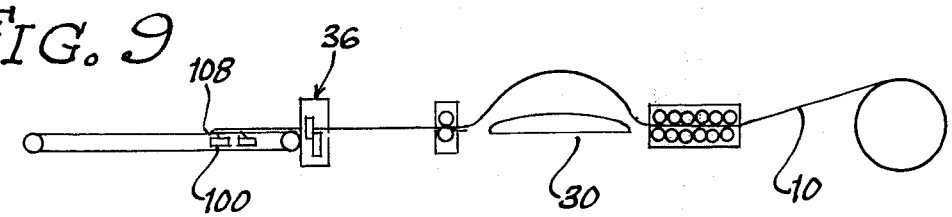
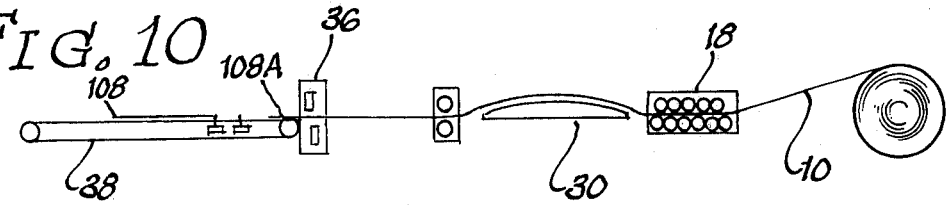
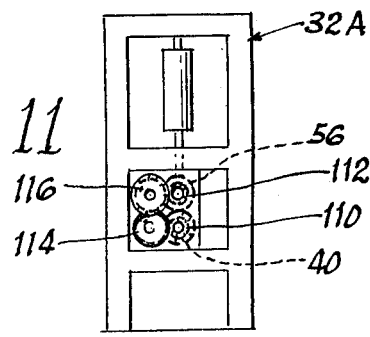

AUTOMATIC STRIP CUTTER

The present invention relates generally to machinery for cutting strips of material, and more particularly to automatic machinery for cutting strips of material to accurately measured lengths or sections.

Strip cutters have conventionally unrolled an elongated strip from a coil and transported the strip along a path on a table and past a shears. Prior to the present invention, three types of strip cutters have been used, namely strip cutters which stopped movement of the strip prior to actuation of the shears, strip cutters which have utilized rapid action shears to cut the section from a slowly moving strip, the strip being stopped by the shears at the moment of cutting, and strip cutters employing flying shears which accommodate the speed of the moving strip to trip and cut the material. U.S. Pat. No. 1,784,556 to Townsend et al entitled "Automatic Shears", and U.S. Pat. No. 3,322,961 to Harrison et al entitled "Method and Apparatus for Controlling the Length of Strip Material" are examples of devices in which the material is stopped before actuation of the shears. In the Harrison patent, a variable speed feed device is utilized to control transporting of the strip material, and the feed device reduces the speed of the strip at a uniform rate of deceleration prior to stopping the material. In the Townsend device, a constant speed feed is used for the strip and a hump table is provided between the feeder rolls and the cutter, and a magnetic brake stops motion of the strip immediately prior to cutting, thus causing the strip to bow upwardly during the period in which the magnetic brake stops the strip at the shears. In the strip cutter of Cauffiel, U.S. Pat. No. 3,768,349 entitled "Method and Apparatus for Severing Elongated Material into Predetermined Lengths", the elongated strip is fed at a continuous rate from a coil of material, but as the leading edge of the strip approaches the desired length, the strip is gripped by a pair of slowly rotating rollers between the feeder and the shears, thus slowing the speed of the strip at the shears but producing a first hump between the feed and the pair of slowly rotating rollers. The low speed of the strip at the shears permits the strip to be stopped at the shears while the strip continues to be driven, and the shears actuated, thus producing a second hump between the shears and the slowly rotating drive rollers.

There are several advantages to an automatic machine for cutting elongated strips which stops movement of the strip prior to actuation of the cutter or shears. Such machines can generally be constructed more readily to achieve a given length accuracy for the section to be cut from the strip than machines in which the shears engage the elongated strip while in motion. Further, the shears of machines which stop the strip motion prior to actuation of the shears need not respond as rapidly as machines in which the shears engage moving strip, and hence the shears are less expensive and require less maintenance.

Three types of automatic cutting machines which stop motion of the elongated strip prior to actuation of the shears are known to the prior art, namely, machines which have variable speed feeds, machines in which the elongated strip is fed into the machine at a continuous but slower rate than is conventionally achieved with cutting machines utilizing variable speed feeds and machines which produce a second hump just prior to actuation of the shears as in U.S. Pat. No. 3,768,349.

Automatic cutting machines which require the feed for the elongated strip to operate at more than one speed have been difficult to construct and costly. The elongated strip is provided to such cutting machines generally in the form of a coil, and the coil has a relatively large mass. Further, the equipment for rotating the coil or pulling the strip from the coil also is subject to relatively large inertia. Accordingly, it is difficult to provide feed mechanisms for such cutting machines which operate other than at a constant rate.

In automatic cutting machines with a constant speed feed and means for stopping the strip prior to shearing, a portion of the strip must be stored on the machine during periods in which movement of the strip on the cutting machine is stopped. Further, it is difficult to accurately stop a rapidly moving strip of elongated material on the machine to permit accurate cutting of the strip into sections when the strip is fed to the cutting machine at a high rate of speed. Hence, such machines have either used relatively low speed feeds, or have used significantly longer tables to provide a space for a second hump to store strip material when the strip is stopped for shearing.

It is an object of the present invention to provide an improved cutting machine for flexible elongated strip which is provided with a constant speed feed and which will accurately stop movement of the strip prior to severing the strip.

Further, it is an object of the present invention to provide such a cutting machine for flexible strip which is inexpensive, can be operated at relatively high speed, and which requires a relatively shorter path length for the strip than prior machines of comparable speed.

In accordance with the present invention, the inventor has provided a machine for cutting sections from a coil of elongated flexible strip which includes means for rotatably holding the coil of the elongated strip to be cut, a strip feeder with two parallel confronting rolls disposed adjacent to the holding means for the coil for engaging the strip normal to the axis of elongation of the strip, the strip feeder including means for rotating the confronting rolls in opposite directions to pull the strip from the coil at a first constant speed, path defining means mounted on the side of the feeder opposite the coil holding means for guiding the strip including a hump table, cutting means responsive to a first signal mounted adjacent to the path defining means, a strip speed control device disposed between the hump table and the cutting means having two rolls disposed normal to and on opposite sides of the path of the strip, said control device including a constant speed motor mechanically coupled to one of the rolls of the control device to drive the periphery of said roll at a second speed less than the first speed and means responsive to a second signal for translating the other of the rolls of the control device toward the one roll thereof to grip the strip therebetween for translating said strip at said second speed, said speed control device also including means disposed between the cutting means and hump table responsive to the first signal to stop translation of the strip between the two rolls thereof, and signal generating means responsive to the position of the leading edge of the strip including a first signal source coupled to the cutting means and translation stopping means for producing a first signal when the leading edge of the strip is located at a first position on the side of the cutting means opposite the control device, and said signal generating means having a second signal source coupled to the control means for producing a second signal when the leading edge of the strip is in a second position located between the cutting device and the first position.

For a more complete understanding of the present invention, reference is made to the drawings, in which:

FIG. 3 is a side elevational view of the feeder unit of the machine illustrated in FIGS. 1 and 2;

FIG. 4 is a sectional view taken along the line 4—4 of FIG. 1;

FIG. 5 is a diagrammatic view illustrating the electrical and pneumatic circuits of the automatic cutting machine of FIGS. 1–4;

FIGS. 6 through 10 are diagrammatic views illustrating a modified construction of the present invention and the operation thereof; and FIG. 11 is a side elevational view of a modified construction of the speed control unit.

Figure 1:
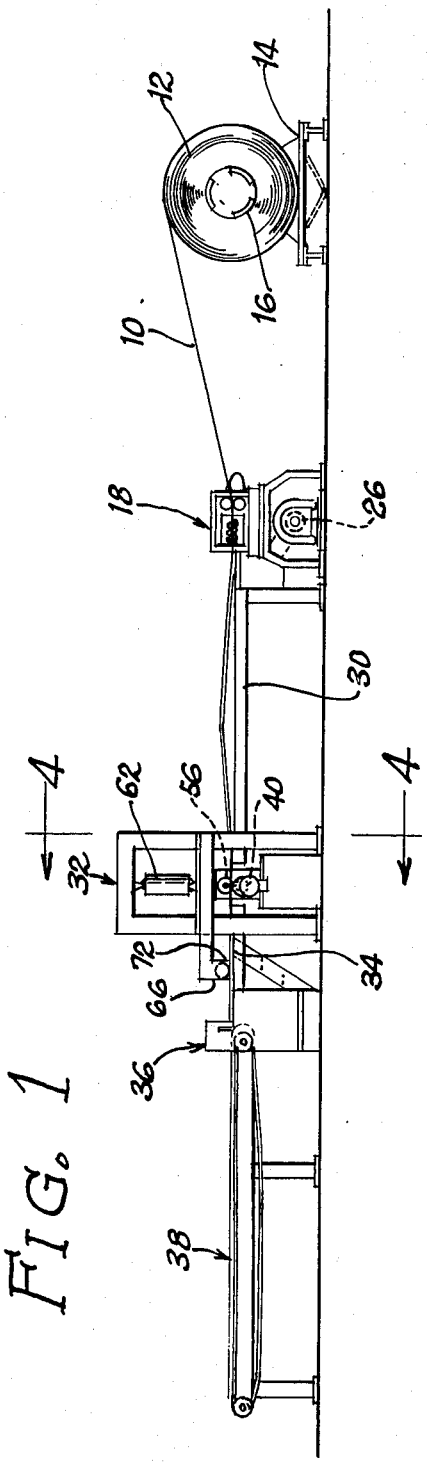
FIG. 1 is a side elevational view of an automatic cutting machine constructed according to the teachings of the present invention.
Figure 2:
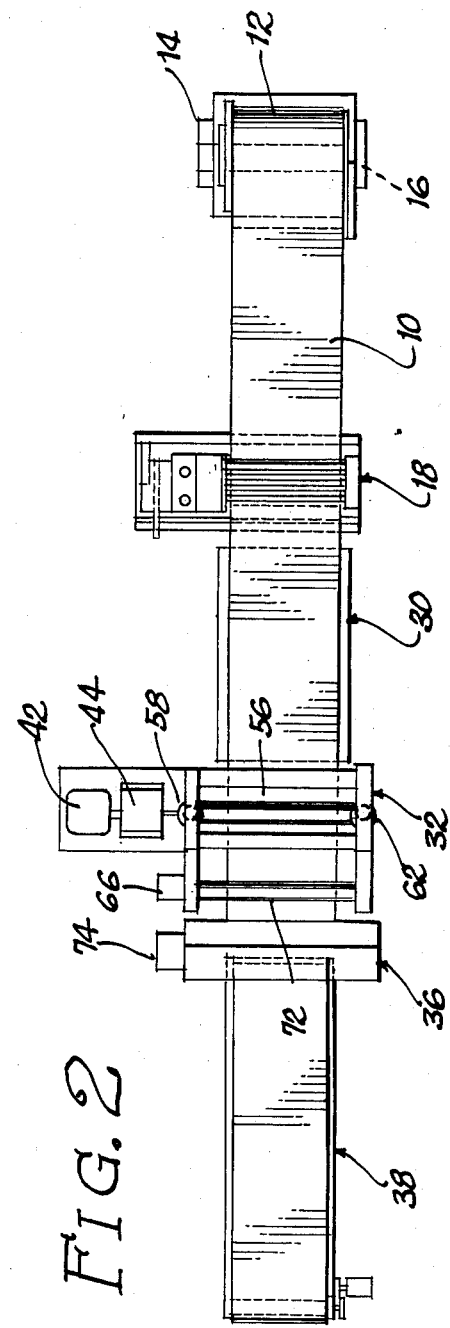
FIG. 2 is a plan view of the machine of FIG. 1.

As illustrated in FIGS. 1 and 2, the elongated strip of material to be cut is designated 10, and the strip is supplied from the roll 12 mounted on a spool carrier 14. The spool carrier 14 has a rotatable mandrel 16 which permits the strip 10 to be pulled from the spool by a feeder and straightener unit 18. The feeder and straightener 18 has a pair of drive rolls 20 and 22 located on opposite sides of the strip 10 and engaging the strip. In addition, the feeder and straightener 18 has a plurality of work rolls 24 located on opposite sides of the strip 10 for the purpose of engaging the strip and working from the strip any set which the strip may have so that the strip coming from the feeder and straightener 18 is straight. The drive rolls 20 and 22 and the work rolls 24 are driven by a motor 26 through a chain 28.

The automatic cutter has a hump table 30 on the side of the feeder and straightener 18, and a strip speed control unit 32 is positioned at the end of the hump table 30 opposite the feeder and straightener 18. The speed control unit 32 feeds the strip 10 over a flat table 34 to a shears 36, and a discharge table 38 is positioned at the side of the shears 36 opposite the flat table 34.

The speed control unit has a lower roll 40 rotatably mounted with its upper surface at the plane of the path of the strip 10. The lower roll 40 is connected to a constant speed motor 42 through a brake and clutch assembly 44. While the motor 42 operates at a single speed in any particular application, the speed may be different for different applications, and the motor 42 may be of variable speed design for this purpose. The lower roll 40 is rotatably mounted on a frame 46 which also carries the motor 42 and the brake and clutch assembly 44. The frame 46 is provided with a pair of channel members 48 and 50 which extend vertically from the lower roll 40, and bearing blocks 52 and 54 are slidably mounted on the channel members 48 and 50, respectively. An upper roll, or pinch roll, 56 is journalled within the bearing blocks 52 and 54 at opposite ends, and rotatable with respect thereto. A first cylinder 58 is mounted on the channel member 48 and has a translatable piston rod 60 connected to the bearing block 52. A second cylinder 62 is mounted on the channel member 50 and has a translatable piston rod 64 connected to the bearing block 54. The upper roll 56 is free to rotate, and the cylinders 58 and 62 may force the upper roll 56 into abutment with the strip 10, thereby forcing the strip 10 to assume the speed of the periphery of the lower roll 40.

The automatic cutting machine is designed to actuate the shears 36 when the leading edge of the strip 10 reaches a point on the discharge table 38 which is spaced from the shears by the desired length of the sections to be cut from the strip 10. This point is selectable by the operator, and when the leading edge of the strip 10 reaches this point, designated the first point, the speed control unit 32 stops motion of the strip 10 and the shears 36 are actuated to sever the strip 10 into the desired section. A first electrical signal impressed upon both the speed control unit 32 and shears 36 achieves this function, and in the embodiment of FIGS. 1 through 5, the first signal is generated by means of an encoder 66, a first counter 68, and a first output circuit 70. The encoder 66 is driven by a roll 72 mounted above the flat table 34 normal to the path of the strip 10 and engaging the upper surface of the strip 10. The roll 72 drives the encoder 66 which is a digital incremental unit, such as the photoelectric encoders available commercially from Dynapar Corporation and other sources. In one particular construction, the encoder 66 produces 600 pulses per revolution, thereby producing 600 pulses each time the leading edge of the strip 10 is advanced by a distance equal to the circumference of the roll 72, although the encoder 66 could produce one pulse for greater or lesser angle changes.

Counter No. 1 totals the pulses received from the encoder 66, and when the count reaches a preset number which establishes the first point on the discharge table 38, the counter 68 excites the output circuit 70 which produces an electrical signal which opens the clutch of the clutch and brake assembly 44 and disengages the constant speed motor 42 from the lower roll 40 of the speed control unit 32. The output signal from the output circuit 70 simultaneously actuates the brake of the clutch and brake assembly to stop the roll 40, and to accordingly stop translation of the strip 10 at the speed control unit 32. The shears respond slightly slower to the output signal from the output circuit 70, and cut the strip 10 after the brake of the clutch and brake assembly 44 has brought the strip 10 to rest.

In order to accurately stop movement of the strip 10 when the leading edge of the strip is at the first point, the roll 40 must transport the strip at a relatively slow rate, significantly slower than the rate at which the strip is transported by the feeder and straightener 18. Accordingly, the motor 42 operates at a constant but relatively slow speed. The upper roller 56 of the speed control unit 32, however, is upwardly displaced from the lower roll 40 until the leading edge of the strip 10 reaches a second point on the discharge table 38 located between the shears 36 and the first point in order to permit the strip to be transported rapidly until the leading edge is near the first point. The second point is slightly displaced from the first point toward the shears 36, and a second signal is generated when the leading edge reaches the second point for controlling the pneumatic cylinders 58 and 62.

The encoder 66 is also connected to a second counter 74, and the second counter is connected to a second output circuit 76. The output circuit 76 is connected to the solenoid 78 of a solenoid actuated spool valve 80. The inlet port 82 of a spool valve 80 is connected to a source of compressed air 84. When the spool is one position, the valve 80 connects the inlet port 82 to an outlet port 86, and the outlet port 86 is connected to ports 88 at the upper ends of the cylinders 58 and 62. In the other position of the spool of the valve 80, the inlet port 82 is connected to an outlet port 90, and the outlet port 90 is connected to ports 92 located at the lower ends of the cylinders 58 and 62. When the spool connects the inlet port 82 to the port 86, then the port 90 is connected to a vent 94. In like manner, when the inlet port 82 is connected to the port 90 of the valve 80, the port 86 is connected to a vent 96.

When the second counter 74 reaches a preset total indicating that the leading edge of the strip 10 is at the second point, that total being less than the total of the first counter when the leading edge of the strip 10 is at the first point, the second output circuit 76 translates the spool of valve 80 to connect the air source 84 with the ports 88 of the cylinders 56 and 62, thereby driving the upper roll 56 downwardly to engage the strip 10. As a result of engagement of the strip 10 by the roll 56, the speed of the strip 10 is reduced to the circumferential speed of the roll 40, the roll 56 being free to rotate at a speed dictated by movement of the strip 10. Accordingly, the leading edge of the strip 10 approaches the first point at a relatively slow rate permitting the brake and clutch assembly 44 to accurately stop the strip 10 when the leading edge of the strip is at the first point. However, since the feeder and straightener 18 continues to feed the strip 10 from the roll 12 at a constant rate during the period that the speed control unit 32 reduces the speed of the strip 10, a hump appears in the strip over the hump table 30. When the brake and clutch assembly 44 completely stops movement of the strip 10, the hump increases at a more rapid rate over the hump table 30 to take up all of the length of the strip 10 fed by the feeder and straightener 18 during the period in which the strip 10 is at rest.

The output from the first output circuit 70 is connected to the reset terminal of the first counter 68 and to the reset terminal of the second counter 74 through a delay circuit 98 which produces a short delay. Accordingly, the leading edge of the signal from the first output circuit 70 is effective after a short delay to reset the first counter 68 and to reset the second counter 74. Accordingly, the output signal from the first output circuit ceases, causing the shears 36 to open, the brake of the clutch and brake assembly 44 to become disengaged, and the clutch of the clutch and brake assembly 44 to become engaged. At the same time, the second counter 74 is reset causing the second signal from the second output circuit 76 to cease, thereby translating the spool of the valve 80 to connect the air source 44 with the lower ports 92 of the cylinders 58 and 62, thereby driving the upper roll 56 of the speed control unit 32 upwardly. Accordingly, the strip 10 may move through the speed control unit 32 without hindrance, and the portion of the strip retained in the hump will be released to propel the leading edge of the strip 10 forwardly over the discharge table 38 to repeat the cycle.

The strip 10 must be of resilient flexible material in order to form the hump over the hump table and to release the hump over the hump table. Sheet metal strips, such as those fabricated of steel, copper, aluminum, paper and other materials having thicknesses ranging from 0.0001 inch upwardly to the limits of the shears may readily be cut utilizing the apparatus of the present invention.

FIGS. 6 through 10 show the process of the present invention utilizing microswitches as the signal source to produce the first and second control signals. The first point is designated by a microswitch 100 having an arm 102 adapted to engage the leading edge of the strip 10. A second microswitch 104 having an arm 106 adapted to engage the leading edge of the strip 10 forms the second control signal source.

FIG. 6 illustrates the strip 10 being fed from the roll 12 through the feeder and straightener 18, over the hump table 30, through the open speed control unit 32 and the open shears 36. It will be noted that the leading edge, designated 108, is approaching the arm 106 of the second microswitch 104 at a speed established by the feeder and straightener 18.

In FIG. 7, the leading edge 108 of the strip 10 has actuated the second microswitch 104, thereby closing the rolls of the speed control unit 32 on the strip 10 and causing a hump to appear over the hump table due to the fact that the feeder and straightner 18 is feeding the strip 10 at a more rapid rate than the drive from the speed control unit 32. It will be noted that the shears 36 are open.

In FIG. 8, the leading edge 108 of the strip 10 has reached the first microswitch 100, but not actuated the microswitch. In FIG. 9, the leading edge 108 has actuated the first microswitch 100 and the shears 36 have closed, the hump over the hump table 30 increasing. In FIG. 10, the severed section of the strip is being transported away from the shears 36 by the discharge table 38, and the new leading edge 108A has been propelled past the shears 36 as the hump over the hump table 30 dissipates.

In the foregoing embodiment, the upper roll 56 is undriven and rotates by contact with the strip 10. If the strip 10 is constructed of slippery material, or material which has grease thereon, it may be desirable for the upper roll 56 to join with the lower roll 40 in driving the strip. FIG. 11 illustrates a modified speed control unit 32A in which the upper roll 56 is driven as well as the lower roll 40.

The lower roll 40 carries a gear 110 at the end of its shaft opposite the brake and clutch assembly 44, and the corresponding end of the shaft of the upper roll 56 carries a corresponding gear 112. The gear 110 is meshed with a substantially larger idler gear 114, and the gear 112 is meshed with a substantially larger idler gear 116. The idler gears 114 and 116 are meshed together, so that drive from the lower roll 40 is transferred through the idler gear 114 and the idler gear 116 to gear 112 and the upper roll 56, thereby driving the upper roll 56 in the opposite direction from the lower roll 40 so that both rolls 40 and 56 advance the strip 10. The use of the large idler gears 114 and 116 permit translation of the roll 56 into abutment with the lower roll 40 while maintaining coupling to the gears 114 and 116, but the gears 110 and 112 at the end of the rolls 40 and 56 do not directly contact each other for any position of the rolls 40 and 56.

Those skilled in the art will devise many modifications of the foregoing structure within the intended scope of the present invention. While electrical signals have been used for control, other types of signals such as pneumatic, hydraulic, or the like may also be used. It is therefore intended that the scope of the present invention be not limited by the foregoing specification, but rather only by the appended claims.

The invention claimed is:

1. A machine for cutting sections from a coil of an elongated strip having a leading edge comprising, in combination, means for mounting the coil of the elongated strip to be cut for rotation about an axis, a strip feeder having two parallel confronting rolls disposed adjacent to the means for mounting the coil for engaging the strip normal to the axis of elongation thereof, said strip feeder including means for rotating said confronting rolls in opposite directions to pull the strip from the coil at a constant first speed, path defining means mounted on the side of the feeder opposite the coil mounting means for guiding the strip including a hump table, cutting means responsive to a first signal mounted adjacent to the path defining means, a strip speed control device disposed between the hump table and the cutting means having two rolls disposed normal to and on opposite sides of the path of the strip, and speed control device including a constant speed motor mechanically coupled to one of the rolls of the control device to drive the periphery of said roll at a constant second speed less than the first speed, said speed control device including means responsive to a second signal for translating the other roll of the speed control device toward the one roll thereof to grip the strip therebetween the translation of said strip at the second speed, said speed control device including means responsive to the first signal to stop translation of the strip at the cutting device, and signal generating means responsive to the position of the leading edge of the strip mounted adjacent to the path of the strip, said signal generating means including a first signal source coupled to the cutting means and translation stopping means for producing said first signal when the leading edge of the strip is located at a first position on the side of the cutting means opposite the control device and a second signal source coupled to the means for translating the other roll of the speed control device for producing said second signal when the leading edge of the strip is in a second position located between the cutting means and the first position.

2. A machine for cutting sections from a coil of an elongated strip having a leading edge comprising the combination of claim 1 wherein the strip feeder comprises a plurality of parallel rolls disposed on both sides of the path of the strip, said rolls engaging the strip and straightening the strip.

3. A machine for cutting sections from a coil of an elongated strip having a leading edge comprising the combination of claim 1 in combination with means on the side of the cutting means opposite the speed control device for translating sections of strip away from the cutting means at a third speed greater than the first speed of the strip from the roll.

4. A machine for cutting sections from a coil of an elongated strip having a leading edge comprising the combination of claim 1 wherein the cutting means comprises an electrically actuated shear, and the first signal source generates an electrical signal.

5. A machine for cutting sections from a coil of an elongated strip having a leading edge comprising the combination of claim 1 wherein the strip speed control device comprises a clutch connected between the constant speed motor and the one roll, said clutch being coupled to the first signal source and disengaging responsive to a signal therefrom, and a brake mounted on the path defining means and connected to the one roll, said brake being coupled to the first signal source and engaging responsive to a signal therefrom, whereby the clutch disengages and the brake engages responsive to a signal from the first signal source.

6. A machine for cutting sections from a coil of an elongated strip having a leading edge comprising the combination of claim 1 wherein the other roll of the strip speed control device is freely rotatable.

7. A machine for cutting sections from a coil of an elongated strip having a leading edgge comprising the combination of claim 1 wherein the strip speed control device is provided with a pair of air cylinders mounted on the path defining means and provided with pistons coupled to opposite ends of the other roll of the speed control device, each of said air cylinders having a compressed air source connected to said cylinder through a valve responsive to a signal, each of said valves being coupled to the second signal source and opening in responsive to a signal from said source to translate the piston of the air cylinder.

8. A machine for cutting sections from a coil of an elongated strip having a leading edge comprising the combination of claim 1 wherein the first signal source comprises an electrical switch having an actuating arm disposed at the first position, and the second signal source comprises an electrical switch having an actuating arm at the second position.

9. A machine for cutting sections from a coil of an elongated strip having a leading edge comprising the combination of claim 1 wherein the signal generating means comprises means mechanically coupled to the strip for generating an electrical pulse in response to each traverse of a fixed length of the strip past a fixed point on the path defining means, and the first signal source comprises the means for generating pulses, a counter electrically connected to the means for generating pulses, and a first output circuit for producing a first output signal when the counter reaches a first predetermined count.

10. A machine for cutting sections from a coil of an elongated strip having a leading edge comprising the combination of claim 9 wherein the second signal source comprises the means for generating pulses, a second counter connected to the means for generating pulses, and a second output circuit electrically connected to the second counter for producing a second output signal when the counter reaches a second predetermined count less than the first predetermined count.

11. A machine for cutting sections from a coil of an elongated strip having a leading edge comprising the combination of claim 1 wherein the other roll of the strip speed control device is mechanically coupled to the constant speed motor for rotation in a direction opposite to that of the one roll of the speed control device.

\* \* \* \* \*

UNITED STATES PATENT OFFICE
CERTIFICATE OF CORRECTION

Patent No. 3,978,703    Dated September 7, 1976

Inventor(s) Theodore Primich, David A. Strilich, and David McLeroy

It is certified that error appears in the above-identified patent and that said Letters Patent are hereby corrected as shown below:

Column 5, Line 66

After "from" delete "0.0001" and insert -- 0.001 --.

Column 7, Line 17

After "strip" delete "and" and insert -- said --.

Column 7, Line 25

After "therebetween" delete "the" and insert -- for --.

Signed and Sealed this

Ninth Day of November 1976

[SEAL]

Attest:

RUTH C. MASON
Attesting Officer

C. MARSHALL DANN
Commissioner of Patents and Trademarks